(12) United States Patent
Dries et al.

(10) Patent No.: US 8,898,339 B2
(45) Date of Patent: Nov. 25, 2014

(54) METHOD OF TRANSFERRING DATA IMPLYING A NETWORK ANALYSER CARD

(75) Inventors: William Mark Dries, Hampshire (GB); Christopher Bloxham, West Sussex (GB); Kathryn Elizabeth Rickard, Hampshire (GB)

(73) Assignee: Napatech A/S, Soeborg (DK)

( * ) Notice: Subject to any disclaimer, the term of this patent is extended or adjusted under 35 U.S.C. 154(b) by 1941 days.

(21) Appl. No.: 10/582,626

(22) PCT Filed: Sep. 12, 2004

(86) PCT No.: PCT/GB2004/005164
§ 371 (c)(1),
(2), (4) Date: Apr. 5, 2007

(87) PCT Pub. No.: WO2005/057856
PCT Pub. Date: Jun. 23, 2005

(65) Prior Publication Data
US 2008/0109575 A1    May 8, 2008

Related U.S. Application Data

(60) Provisional application No. 60/528,717, filed on Dec. 12, 2003.

(51) Int. Cl.
*G06F 15/16* (2006.01)
*G06F 13/38* (2006.01)
*H04L 12/883* (2013.01)
*H04L 12/26* (2006.01)

(52) U.S. Cl.
CPC ............ *G06F 13/385* (2013.01); *H04L 12/2631* (2013.01); *H04L 12/2623* (2013.01); *H04L 49/9015* (2013.01)

USPC .......................................................... 709/250

(58) Field of Classification Search
CPC ............ H04L 12/2623; H04L 12/2631; H04L 49/9015
USPC .......................................................... 709/250
See application file for complete search history.

(56) References Cited

U.S. PATENT DOCUMENTS 4,228,496 A * 10/1980 Katzman et al. ............... 710/100
4,769,810 A *  9/1988 Eckberg et al. ................. 370/232
5,303,347 A *  4/1994 Gagne et al. .................... 711/119
5,317,692 A *  5/1994 Ashton et al. ..................... 711/5

(Continued)

OTHER PUBLICATIONS

Tcl Clock, 1996, [online], [retrieved on Jun. 8, 2009]. Retrieved from the Internet< URL: http://www.astro.princeton.edu/%7Erhl/Tcl-Tk_docs/tcl/clock.n.html>.*

*Primary Examiner* — Michael Chao
(74) *Attorney, Agent, or Firm* — Pillsbury Winthrop Shaw Pittman LLP (57) ABSTRACT

In conventional systems the CPU is altered after a data frame has been received and the packet stored in a host buffer. This interrupts normal operation of the CPU and applications, which is determined to systems performance. The invention relates to a method of transferring data from a network to a host using a network analyzer card, where a plurality of data frames from a network link is received and a descriptor is added to the frame. The descriptor includes data about the frame; each data frame and its or their attached descriptor is transferred to a host memory.

17 Claims, 3 Drawing Sheets

(56) References Cited

U.S. PATENT DOCUMENTS

| | | | |
|---|---|---|---|
| 5,371,855 A * | 12/1994 | Idleman et al. | 711/113 |
| 5,497,404 A * | 3/1996 | Grover et al. | 375/240.27 |
| 5,859,846 A * | 1/1999 | Kim et al. | 370/395.62 |
| 5,903,774 A | 5/1999 | Hannah | |
| 5,991,862 A * | 11/1999 | Ruane | 711/202 |
| 6,185,575 B1 * | 2/2001 | Orcutt | 1/1 |
| 6,434,620 B1 | 8/2002 | Boucher et al. | |
| 6,480,489 B1 | 11/2002 | Muller et al. | |
| 6,510,164 B1 * | 1/2003 | Ramaswamy et al. | 370/466 |
| 6,581,063 B1 * | 6/2003 | Kirkman | 1/1 |
| 6,721,872 B1 * | 4/2004 | Dunlop et al. | 712/28 |
| 7,028,023 B2 * | 4/2006 | Wang | 1/1 |
| 2002/0105911 A1 * | 8/2002 | Pruthi et al. | 370/241 |
| 2003/0188054 A1 | 10/2003 | Yosimoto et al. | |

\* cited by examiner

METHOD OF TRANSFERRING DATA IMPLYING A NETWORK ANALYSER CARD

CROSS REFERENCE TO RELATED APPLICATIONS

This is the U.S. National Phase of PCT/GB2004/005164, filed Sep. 12, 2004, which in turn claims priority to U.S. Provisional Patent Application No. 60/528,717, filed Dec. 12, 2003, both of which are incorporated herein in their entirety by reference.

The present invention relates to a method of transferring data from a network into the application space of a host, a network analyser card, a host for connection to a network, a method of navigating through a memory and a method of creating a merged data stream.

Although in much literature on networks the terms "frame" and "packet" are used interchangeably, in the present specification "frame" is used to refer to a unit of data received from a network link, and "packet" is used to refer to a unit of data sent to the host by the network analyser card.

Network interface cards and network analyser cards have in common the ability to receive data frames e.g. Ethernet frames, ATM frames, IP frames etc. and store them as packets in the memory of their host system referred to hereinafter as "the host". Typically, they are provided arranged or for arrangement in a host system e.g. a PC, connected to a network via a network link. In use both network interface cards and network analyser cards are configured to transfer data received from the network into an associated memory of the host system.

Network interface cards and network analyser cards have different priorities. A network interface card is required to handle each frame/packet of data received from the network with minimum latency i.e. minimum delay from when the packet is received from the network on the network link to when it is available in the memory of the host system. This is not important for a network analyser card. A network analyser card instead needs to store packets in real time at the highest possible data rate, with the minimum involvement of a central processing unit (CPU) of the host. Whereas for a network analyser card latency is not an issue, it is extremely important that data packets are not lost since this could have an effect on any analysis of the network. Minimum involvement of the host CPU is also desired so that as much of the processing capacity of the host CPU as possible can be devoted to analysing the packets in whatever manner is required by an associated application.

If the host CPU cannot analyse the packets sufficiently quickly, memory buffers in which the packets are stored become full and frames then have to be dropped. This is clearly undesirable especially in applications where all the frame data needs to be analysed to reconstruct conversations or transactions occurring on the network for (amongst others) diagnostic, forensic, security, billing and monitoring purposes.

In conventional network analyser cards, after a data frame has been received from a network and the corresponding packet directed to and stored in the host buffer, the host CPU is alerted so that it can retrieve the stored data. This interrupts normal operation of the CPU i.e. operation of the CPU relating to the application. Excessive interruption of the host. CPU is detrimental to its overall performance.

Each time the CPU takes an interrupt it uses processing cycles to perform the switching from the interrupted task to the task that will run in response to the interrupt. The time taken to do this could otherwise have been spent doing useful work. Therefore it is desirable to reduce the number of interrupts that occur while packets are being processed.

U.S. Pat. No. 6,434,620 discloses an intelligent network interface card or communication processing device arranged to work with a host computer for data communication. The device provides a fast-path that avoids protocol processing for most messages thereby accelerating data transfer and offloading time-intensive processing tasks from the host CPU.

U.S. Pat. No. 6,480,489 discloses a system and method for transferring a data packet received from a network to a host computer according to an operation code associated with the packet. A packet received at a network interface is parsed to retrieve information from a header portion of the packet. Based on a packet code, a transfer engine stores the packet in one or more host memory buffers.

U.S. Pat. No. 5,809,328 discloses an apparatus for adapting transmission between an industry standard data bus of a host computer and a peripheral storage sub-system having at least one disk drive. The apparatus includes interface logic coupled between the industry standard bus and a local bus of the apparatus.

According to a first aspect of the present invention, there is provided a method of transferring data from a network to a host using a network analyser card, the method comprising:

at the network analyser, receiving a plurality of data frames from a network link; and, adding a descriptor to at least some of the data frames, the descriptor including data about the frame; and, transferring the or each data frames and its or their attached descriptor to a host memory.

Preferably the method comprises adding a descriptor to each of the data frames.

Preferably, the descriptor includes a field indicative of the length of the data frame to which it is attached. In addition, it is preferred that the descriptor includes a field indicative of one or more of the order in which the data frame to which the descriptor is attached was received with respect to other received data frames and a field indicative of the channel from which the data frame to which the descriptor is attached was received.

By adding data indicative of one or more of the length of a data frame, the order it was received with respect to other data frames and the channel from which it was received, stored data packets can be easily navigated. For example, software for locating a particular data frame (e.g. in a host memory) can automatically move from one data packet to the next by referring to the length of the stored packet in the descriptor.

Preferably a list of offset pointers is stored with the data packets from one or more channels in the host memory. The list of offset pointers enables data from different channels to be merged. Instead of copying packets into the correct order, the offset pointers can be accessed to enable the application to access the data frames in a desired order.

Preferably, the data is transferred to a region of host memory directly accessible to a host application.

Conventionally, data packets have been written first to a kernel memory region and then they have been copied to an application host memory region from where they can be accessed by the host application. In an embodiment of the present system, they are written directly to a region of host memory from which they can be accessed directly by the host application. This therefore reduces the need for copying which uses host CPU capacity and which reduces available CPU capacity for dealing with the application itself.

According to a second aspect of the present invention, there is provided a method of transferring multi-channel data received from a network to a host using a network analyser card, the network analyser card comprising a receiver for receiving plural data frames from a network link on a first channel and a receiver for receiving plural data frames from the network link on a second channel; a descriptor adder configured and arranged to add a descriptor to at least some of the data frames received on the first channel and a descriptor adder configured and arranged to add a descriptor to at least some of the data frames received on the second channel, the descriptors including data about the data frame to which it is attached. The method comprises:

receiving data from first and second channels on the receivers of the network analyser card; and, adding an indicator in the descriptor associated with received data frames indicative of the next channel on which a data frame was received, whereby when stored in an associated host memory said indicators can be used to merge data from said first and second channels in a desired order.

Preferably, a descriptor is added to all the data frames received on the first and second channels.

In one example, the network analyser card is provided with a number of receivers and descriptor adders to correspond to the number of channels on which data is received from the network. This might be any number in dependence on the capacity of the network. Typically, the number of channels might be up to 8 or 16.

According to a third aspect of the present invention, there is provided a network analyser card, the card comprising:

a receiver for receiving plural data frames from a network link; and, a descriptor adder configured and arranged to add a descriptor to at least some of the received data frames, the descriptor including data about the data frame to which it is attached for use in processing of the data frame.

Preferably, the descriptor adder is configured and arranged to add a descriptor to all of the received data frames.

A network analyser card is provided with a descriptor adder arranged to attach a descriptor to received data frames. The attachment of a descriptor to received data frames enables useful data relating to the frame to be associated with it. This enables subsequent processing of the data to be improved. For example, processing of the data by an associated host CPU can be improved as a consequence.

According to a fourth aspect of the present invention, there is provided a network analyser card for connection to a host computer, the network analyser card comprising:

an input buffer for receiving data frames from a network to which the host is connected;

a meta data insertion unit for attaching meta data to each data frame, the meta data relating to parameters of the data frame; and, an output generator for transferring data frames and attached meta data to a host buffer associated with the host, in dependence on the meta data attached to the data frames.

According to a fifth aspect of the present invention, there is provided a network analyser card, the card comprising:

a first receiver for receiving plural data frames from a network link on a first channel; and, a second receiver for receiving plural data frames from the network link on a second channel;

a first descriptor adder configured and arranged to add a descriptor to at least some of the received data frames from the first channel, the descriptor including data about the data frame to which it is attached for use in processing of the data frame;

a second descriptor adder configured and arranged to add a descriptor to at least some of the received data frames from the second channel, the descriptor including data about the data frame to which it is attached for use in processing of the data frame; wherein the first and second descriptor adders are configured and arranged to add an indicator to the data frames received by each of the two receivers to enable merging of data from the channels in an associated host.

According to a sixth aspect of the present invention, there is provided a host for connection to a network, the host comprising:

a network analyser card according to any of the third to fourth aspects of the present invention;

a central processing unit; and, a memory to receive and store data packets received from the network analyser card, the computer being arranged such that the central processing unit is only interrupted when two or more data packets are received in the memory from the network analyser card. The number of data packets after which the CPU is interrupted can be varied, for example, according to user preference.

In conventional systems, when a data frame is received by a network analyser card, it is transferred to the host memory from which it can then be copied to application memory for processing by the application. After the data packet has been placed in host memory, the host CPU is interrupted. In an example of the present system, the host CPU is not usually interrupted when a single data packet has been stored in the host memory. Accordingly, the host CPU is interrupted less often than in conventional systems and therefore efficiency of the host CPU is improved as a larger proportion of CPU processing capacity can be used for dealing with applications such as network analysing or analysis of the data stored in the memory.

According to a seventh aspect, of the present invention, there is provided a method of navigating through a memory, the memory being arranged for storage of data packets, at least some of and preferably all of the data packets including a descriptor containing information about the data packet, the method comprising: reading the descriptor of a first data packet to obtain information about the first data packet; and, in dependence on said information, accessing a subsequent data packet.

According to an eighth aspect of the present invention there is provided a method of creating a merged data stream in a network analyser, using data stored in regions of the host memory of the network analyser the regions corresponding to channels from which the data was received by the host from a network to which the network analyser is connected, the merged data stream comprising data from at least two channels merged in a desired order, the method comprising: reading data of a first data packet from a first channel stored in a first region of the host memory; reading a descriptor associated with the first data packet, the descriptor containing an indicator of the next channel to be accessed; and, in dependence on the indicator, reading data of a data packet from the next channel.

A method of creating a merged data stream is provided that relies on reading a descriptor associated with a first data packet and using information from the descriptor to select data packets from a next channel. By reading data packets from different channels in sequence from the regions in which the data packets are stored in the host memory the conventional requirement for copying these data packets into a further memory region containing a merged data stream is obviated. Furthermore, use of an indicator of the next channel to be accessed, as opposed to a chronological timestamp, reduces the software overhead usually required for preparing a merged data stream in a network analyser.

Conventionally, to create a merged data stream, data from individual channels arranged in kernel space of a host memory are copied according to the chronological order in which they were received into a merged data stream in application space of the host memory. In contrast, in an example of the present system the indicator (associated with at least some of and preferably all of the data packets) of the next channel from which a data packet should be accessed may be used by the application software to access data packets in merged order without any requirement for copying of data packets into a different region of host memory. This reduces the amount of copying of data required providing improvement in the operation of the host CPU.

Preferably, the method comprises reading a Next Channel Indicator bit stored in the descriptor and accessing a subsequent data packet from a next channel in dependence on the Next Channel Indicator bit.

Preferably, the location of data packets in the host memory is stored in an offset list containing a list of offsets used for navigation through the host memory.

This provides the advantage that the data packets can be accessed in a desired order without any analysis of the data contained in the packet.

According to a ninth aspect of the present invention there is provided a method of creating an offset list corresponding to memory addresses of data packets stored in regions of a host memory of a network analyser, the regions corresponding to channels from which the data was received by the host from a network to which the network analyser is connected, the method comprising:

as data packets are received in the host memory, in dependence on an indicator associated with each data packet, generating an offset indicative of the location within the memory of a subsequent data packet; and, writing said offset to a defined region of the host memory.

According to a tenth aspect of the present invention there is provided a host for connection to a network, the host comprising a network analyser card, a memory and a central processing unit, wherein the network analyser card is arranged and configured to receive data frames from the network and comprises a hardware component configured to cause a received frame to be dropped in dependence on the amount of data stored in the host memory and/or a memory provided on the network analyser card.

In one example, the network analyser card is arranged and configured to transfer data packets to the host memory, wherein the number of data packets transferred in a single data transfer operation is variable.

Preferably, the host central processing unit is interrupted due to receipt of data packets in the host memory when a sufficient number of data packets to fill a section of the host memory has been received or if no further packets have been received in the host memory in a determined time period. The determined time interval may be determined by an application running on the host. Alternatively, it may be some predetermined time interval.

According to an eleventh aspect of the present invention there is provided in a host for connection to a network, the host comprising a network analyser card for receiving data frames from the network, the network analyser card being arranged and configured to add a descriptor to received data frames containing data about the data frame to which it is added for use in processing of the data frame, a host memory and a central processing unit associated with the host, the provision of one or more of the following features:

(a) the network analyser card comprising a hardware component configured to cause a received frame to be dropped in accordance with criteria relating to the amount of data stored in the host memory and/or a memory provided on the network analyser card;

(b) the descriptor including a hardware-generated indicator for use in determination of the order or receipt of a data frame with respect to other received data frames;

(c) the network analyser card being arranged and configured to add a timestamp to received data frames;

(d) the network analyser card being arranged to transfer data packets to an area of the host memory directly accessible to an application running on the host;

(e) the network analyser card being arranged and configured to transfer data packets to the host memory, wherein the number of data packets transferred in a single data transfer operation is variable; and, f) the host central processing unit being interrupted due to receipt of data packets in the host memory when a sufficient number of data packets to fill a section of the host memory has been received or if no further packets have been received in the host memory in a determined time. The time may be determined by the application.

This contrasts with conventional systems in which the host central processing unit is interrupted when each data packet is received.

Embodiments of the present invention will now be described by way of example with reference to the accompanying drawings, in which.

Figure 1:
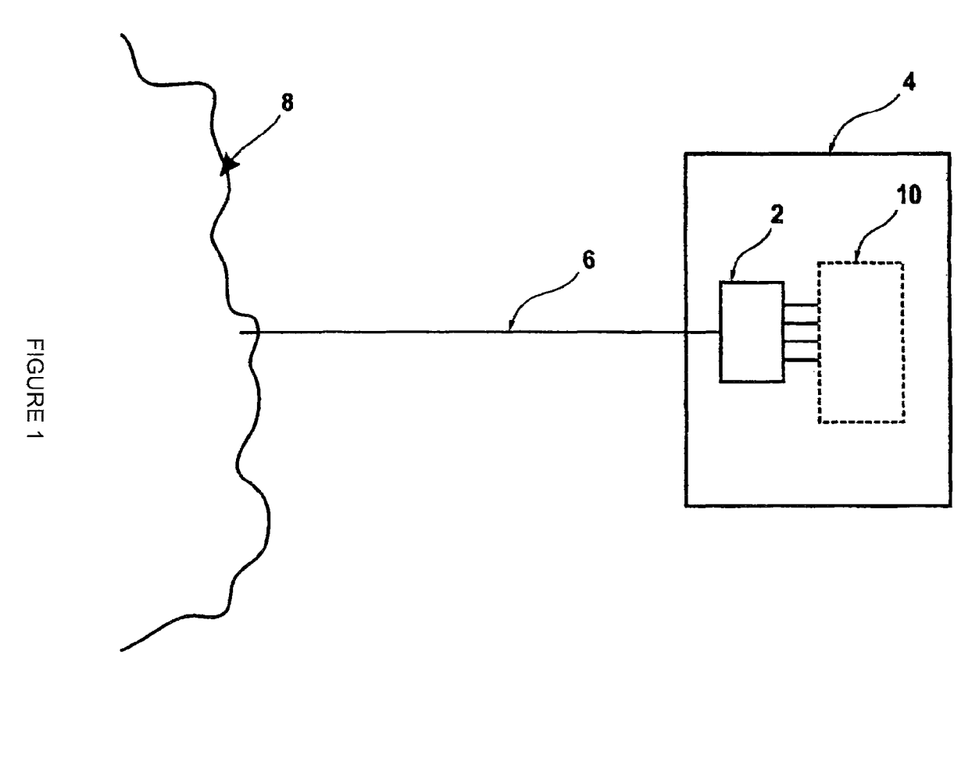
FIG. 1 shows a schematic representation of a network analyser card according to an example of an embodiment of the present invention arranged to receive data frames from a network and provide data packets to a host.

FIG. 1 shows a schematic representation of a network analyser card 2 arranged on board a host computer 4. The computer 4 (and network analyser card 2) is connected via a network link 6 to a network 8. For clarity, most features of the host computer 4 are not shown. The network analyser card 2 is connected to a memory 10 of the host computer 4.

In use, data frames are received by the network analyser card 2 from the network 8 via the link 6. The data frames are processed and corresponding data packets are then transferred to the memory 10 of the host computer 4. It will be understood, that host computer 4 may be any type of system with which network analyser card 2 may desirably be used. For example, it could be a PC, a UNIX-based system, a network analyser, a network monitor, or any other such type of system.

Figure 2:
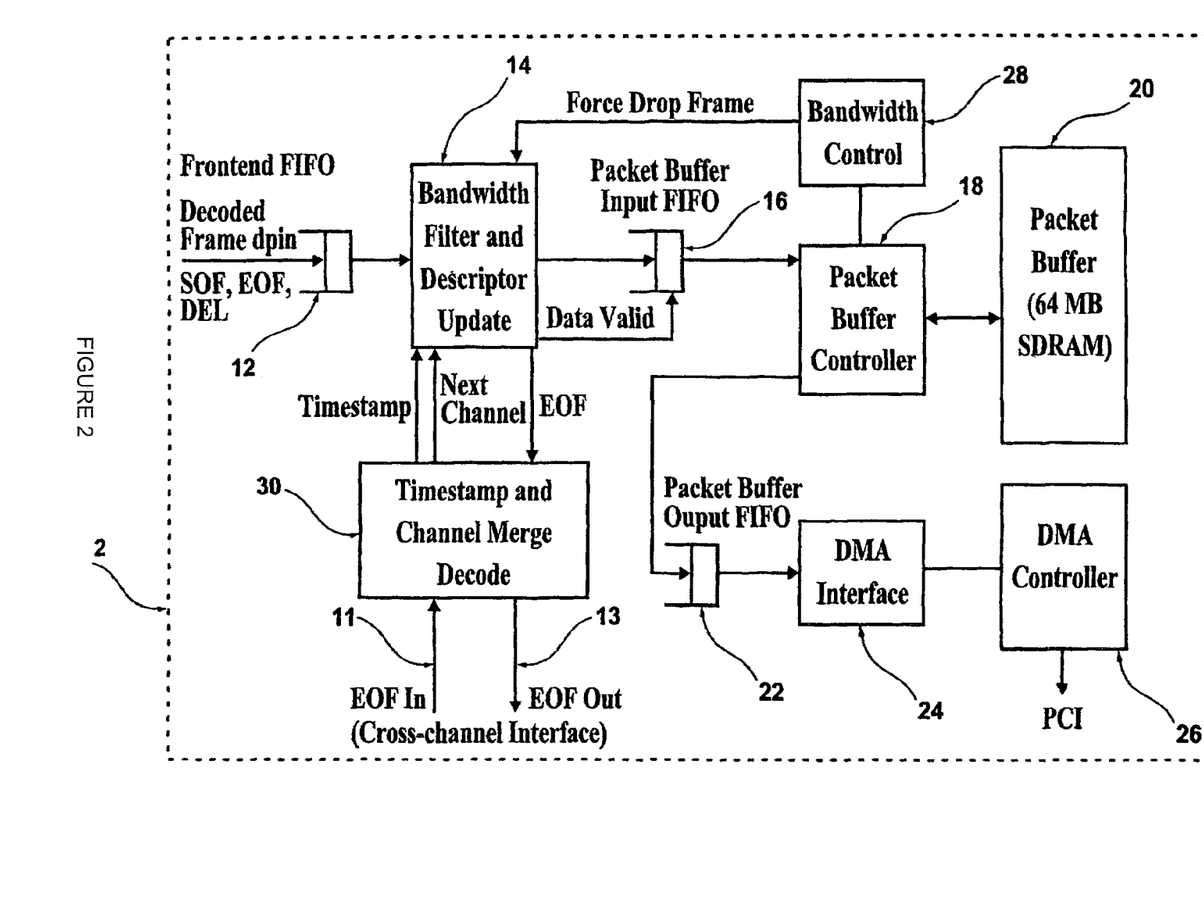
FIG. 2 shows a schematic block diagram of a network analyser card according to an example of an embodiment of the present invention; and, FIG. 3 shows a schematic representation of the memory layout of a host arranged to receive data packets from a network analyser card as shown in FIG. 2.

FIG. 2 shows a schematic block diagram of a stream packet feed function of a network analyser card for handling data frames/packets received on a single channel. In the example shown, the stream packet feed function is arranged in an application specific integrated circuit (ASIC) or a field programmable gate array (FPGA). It could be arranged in one or more ASICs or FPGAs or any other suitably configured hardware. In this example, the ASIC or FPGA comprise the hardware in which the packet stream feed function is embodied.

The network analyser card 2 comprises a front end first in first out (FIFO) buffer 12. The front end FIFO buffer 12 is connected to a bandwidth filter and descriptor update unit 14 which is itself connected to a packet buffer input FIFO 16. A packet buffer controller 18 is arranged to receive an input from the packet buffer input FIFO 16 and provide data packets to a packet buffer 20.

From a further output, the packet buffer controller 18 is connected to a packet buffer output FIFO 22 which itself has an output connected to Direct Memory Access (DMA) controller 26 via a DMA interface 24. A bandwidth control block 28 provides feedback to the bandwidth filter and descriptor update unit 14 from the packet buffer controller 18. A timestamp and channel merge decode unit 30 is connected to the bandwidth filter and descriptor update unit 14. As will be explained below the timestamp and channel merge decode unit 30 provides a timestamp or counter and a flag (referred to as the Next Channel Indicator bit and described in detail below) to the descriptor attached to a frame that is used in subsequent processing of the data frame. A "Data valid" signal may be provided to confirm the validity of data transferred to the packet buffer input FIFO 16.

Prior to being received by the network analyser card 2, raw frame data from the network link 6 (shown in FIG. 1) is converted from 10 bit to 8 bit coding, and all data bytes after the last cyclic redundancy check (CRC) byte of the previous frame up to and including the byte before the media access control (MAC) destination address of the new frames are stripped off. The front end FIFO 12 allows data frames to be transferred from the link clock domain to the timestamp clock domain of the network analyser card. This minimises variations in latency which might otherwise distort the timestamp accuracy. The front end FIFO 12 also provides buffering to allow time for insertion of a frame descriptor as will be explained in more detail below.

The frame, decoded in the manner described above, then passes through the front end FIFO 12 and into the bandwidth filter and descriptor update unit 14. A descriptor is added to each frame. The data bandwidth filter and descriptor update block 14 reads data from the front end FIFO 12 continuously, pausing only to insert the frame descriptor. If the front end FIFO 12 becomes full, further frames received whilst it is full are dropped. However, the front end FIFO 12 will only become full if sustained illegal short frames and illegal inter-frame gaps are present in the data stream provided to it from the network.

To allow a single bandwidth control frame drop point, and also to allow the correct calculation of the next channel indicator (to be described below) in the frame descriptor, the bandwidth filter and descriptor update block 14 is also configured to drop frames in response to a signal from the bandwidth control block 28. The bandwidth filter and descriptor update block 14 maintains a count of the number of frames dropped.

The descriptor is added immediately after the end of the frame. Subsequently, it is moved to precede the frame later in the data flow of the network analyser card 2. After the descriptor has been added to the frame, the data is passed to the packet buffer input FIFO 16. This allows the data packets to be written to the packet buffer 20 via packet buffer controller 18 in burst transfers rather than single transfers, thereby optimising the use of the available bandwidth of whatever kind of RAM, for example SDRAM, is used for the packet buffer 20. In addition, this provides a mechanism to move data from the timestamp clock domain to the packet buffer clock domain.

The writing of data to the packet buffer 20 is controlled by the packet buffer controller 18. This also controls the reading and refreshing (if required for the RAM type) of the packet buffer 20. The packet buffer controller 18 also functions to move the descriptor from the end of the frame it describes to precede the frame it describes.

Bandwidth control block 28 monitors the state of the input and output FIFOs 16 and 22 and of the packet buffer 20 via packet buffer controller 18. The read and write accesses of the packet buffer 20 are prioritised by the bandwidth control block 28. The overriding priority is to avoid the dropping of frames if at all possible. However, in certain situations the packet buffer input FIFO 16 can become full. If this happens, the bandwidth control block 28 instructs the bandwidth filter and descriptor update block 14 to drop frames. This allows the bandwidth filter and descriptor update block 14 to perform certain housekeeping functions necessary when frames are dropped, such as maintaining a count of the number of dropped frames and the correct manipulation of the next channel indicator bits, to be described in detail below.

Reading the packet buffer 20, i.e. transferring data packets to the packet buffer output FIFO 22, has priority over writing to the packet buffer, i.e. transferring data packets to the packet buffer, when a number of conditions are satisfied. These conditions are:
1. Packet Buffer is not empty AND
2. (Packet Buffer Input FIFO is not full) OR (Packet Buffer is full) AND
3. Packet Buffer Output FIFO is not full.

Two thresholds are defined for the purpose of controlling read/write functions to and from the packet buffer 20. Typically, the thresholds are set by software and may be varied and/or controlled in accordance with user instructions. They are the high threshold level and the low threshold level. These influence the prioritisation of the accesses to the packet buffer 20, and control the size of packet stream samples e.g. the number of packets when the incoming data rate to the packet buffer exceeds the transfer bandwidth to the host buffer. The separate levels provide hysteresis so that a packet stream sampling profile can be configured to consist of large samples with large gaps or small samples with small gaps when frames are dropped for reasons of bandwidth constraint.

A packet buffer full status bit is set when the packet buffer level equals the high threshold and is reset when the level equals the low threshold. This status bit is used by the bandwidth control block 28 to prioritise packet buffer accesses.

In this example, the requirement that "packet buffer is not empty" means that the packet buffer has at least one complete packet in it. This is not the same as "packet buffer is full", which means that the high threshold in the packet buffer has been reached.

Once the high threshold has been reached, the packet buffer 20 appears full until a block of data equal in size to the difference between the high and low thresholds has been transferred out of the packet buffer 20 and ultimately to the host buffer. This provides a way of controlling the size of the DMA burst that occurs when the high threshold has been reached. If the packet buffer was allowed to appear not full as soon as the amount of data stored in it fell below the high threshold, the packet buffer access priority logic described above would allow the packet buffer to be written (in its desire to avoid frames being dropped). This would end the DMA burst. Some applications may prefer to have the data transferred in large DMA bursts, even at the risk of causing packets to be dropped. This may therefore cause frames to be dropped, even though there is space for them in the packet buffer, if the packet buffer input FIFO 16 becomes full.

The packet buffer output FIFO 22, buffers data packets fetched from the packet buffer 20 so that they are ready to be transferred to the host memory (not shown in FIG. 2) via the DMA controller 26. The transfer of a data packet from the packet buffer 20 to the output FIFO 22, does not begin until the complete packet is in the packet buffer 20 and the descriptor has been moved to precede the frame. The packet buffer output FIFO 22 also functions as a mechanism to move the data packets from the packet buffer clock domain to the DMA controller clock domain.

The timestamp and channel merge decode block 30 contains timestamp counters and flags which are provided to the bandwidth filter and update block 14 to be included in the descriptor added to each frame.

As will be explained below, a timestamp field is provided in the descriptor. The timestamp and channel merge decode block 30 also contains the next channel indicator generation logic used to provide the next channel indicator in the next channel indicator field in the descriptor described below with reference to Table 1. Furthermore a means to synchronise the timestamp counter with that provided for timestamping data from a different channel is also provided.

A timestamp counter or flag source is provided as part of the timestamp and channel merge decode block 30. Typically the timestamp counter is a free running counter and is sampled at the end of each frame i.e. at a point in time corresponding substantially to time of receipt of an End Of Frame bit from a particular frame. This sampled value is inserted into the descriptor in the timestamp field.

Any suitable counter may be used and indeed varying degrees of resolution may be used. For example, a high resolution counter may be used providing a resolution of 10 ns. A Windows ® style counter may be used having a resolution of 100 ns. Alternatively a packet capture (PCAP) counter may be used. This has two 32 bit fields which provide time in seconds and microseconds.

It will be appreciated that a data flow shown in FIG. 2 of a network analyser card operates in parallel for each channel on which data frames are received from the network. To synchronise the timestamps provided to the data packets received from the network in the descriptors from the bandwidth filter and descriptor update block 14 as an end of frame (EOF) bit is received this is communicated to parallel data paths so that timestamps may be synchronised across channels. This is shown by arrows 11 and 13 respectively into and out of the timestamp and channel merge decode block 30.

When an EOF bit is received, this is communicated to parallel channel data paths via the timestamp and channel merge decode block 30(arrow 13). Similarly, when an EOF bit is received in a different channel, this is communicated to the timestamp and channel merge decode block (arrow 11). As will be explained below this enables synchronisation and determination of the order in which data is received on all channels.

The packet stream descriptor referred to above will now be described in detail. Table 1 below contains a list of the fields present in a typical packet stream descriptor and the number of bits typically associated with each field. Other descriptors could be defined and used to provide the information that the application needs. Typically, a 16-byte descriptor is added to each frame before the packet (i.e. the frame with descriptor attached) corresponding to the frame is stored in the packet buffer 20.

Each descriptor immediately precedes the frame it describes. This enables software associated with the host or the network analyser card to navigate through the packet buffer 20 or host memory, respectively, using an entry (e.g. the stored length field) in the descriptor as a pointer to the next packet.

TABLE 1

| Name | number of bits |
|---|---|
| Stored length | 16 |
| Frame slice | 1 |
| Wire length | 16 |
| Frame CRC error | 1 |
| Good TCP checksum | 1 |
| Good UDP checksum | 1 |
| Good IP checksum | 1 |
| IP frame | 1 |
| Code violation | 1 |
| Drop activated | 1 |
| Next channel indicator | 1+ |
| Channel | 1+ |
| Timestamp | 64 |
| Reserved | 22− |

Referring to Table 1, the data packet descriptor includes a stored length field used to indicate the length of the packet to which it is attached. A wire length field is also provided to indicate the length of the frame (included in the packet) as it was on the network i.e. prior to receipt by the network analyser card. These lengths will be different if the frame has been sliced (truncated) by the network analyser card. A frame CRC error field is provided to indicate whether or not in the packet a CRC error was detected. A number of checksums are provided to provide a check of the integrity of the packet in relation to a number of different protocols by which the frame will have been transferred prior to receipt by the card 2. In the examples shown, a Transfer Control Protocol (TCP), a User Datagram Protocol (UDP) and an Internet Protocol (IP) checksums are all provided.

In this example, an IP frame field is provided in the descriptor. This provides an indication of whether or not each individual packet is an IP frame. A code violation field is also provided to provide an error check for the 10 bit/8 bit code conversion mentioned above. A drop activated field is provided. This functions as a flag to indicate that a frame or indeed many frames have been dropped between the last frame transferred and this frame which may have occurred for one or more reasons. For example, the previous frame(s) might have been dropped due to bandwidth limitations.

The next field in the packet descriptor is a Next Channel Indicator which is described in more detail below. Similarly, the Channel field is described in more detail below. Finally, a Timestamp field and a Reserved Bits field are provided. The Timestamp field is used to provide an indication of the time at which the frame was received and importantly the order (with respect to other received data frames) in which the particular data frame was received. The Reserved Bits field provides spare data capacity within the descriptor if it is needed.

The Next Channel Indicator bits and their function will now be described. A packet buffer 20 shown in FIG. 2 is provided for each channel for which data is received from the network. As will be explained below, the contents of these packet buffers 20 are independently transferred to separate host buffers (regions) within the host memory. Any merging of channels is performed by host CPU software. As explained above, the timestamps (or flags) of all the channels are synchronised, so merging into chronological order could be achieved by comparing timestamps. However, this is a time-consuming procedure for software, and to facilitate this process the hardware dedicated to transferring one channel's data into its Packet Buffer, provides bits in the descriptor of each frame, which the host software can use to select the packets in chronological order. These bits are called the Next Channel Indicator bits.

The process by which the Next Channel Indicator bit is generated will now be described with reference to two channels CH0 and CH1.

A 1-bit state register, f is provided e.g. by the timestamp and channel merge decode blocks 30 for each of channels CH0 and CH1. The registers f are clocked by the timestamp clock and updated when an end-of-frame (EOF) is received on either channel.

When the network analyser is inactive f is cleared to zero.

A common reset signal is used to reset the timestamp counter and state registers f for each channel to ensure that both channels are synchronised.

If EOFs occur on both channels at the same time, one channel's EOF is treated as having occurred first, and the other channel's on the next clock cycle. The channel that will be presumed to be first is selectable.

When an EOF occurs on one channel (say CH0) the current value of f for that channel (CH0) is latched in another 1-bit register, ready for storage in the descriptor of the just completed frame. f is then cleared in the same clock cycle.

When an EOF occurs on the other channel (CH1) the value of f for the first channel (CH0) is set to one. This happens in the same clock cycle as f is updated for the other channel (CH1).

Accordingly, at any time after the first frame has been received the value of one channel's f will be 0 and the other channel's f will be 1. The Next Channel Indicator bits for data frames received on each of the channels may be used by host software to perform a merge of data from the two channels. When merging of the channels is required, host software acts as follows to recover the data packets in chronological order:

1. Read the descriptor at the beginning of each channel buffer.
2. Ascertain which channel's descriptor has 0 in the Next Channel Indicator. Let this (say CH0) be the current channel.
3. Read the packet from the current channel (CH0).
4. Read the next descriptor on the current channel (CHO).
5. If the Next Channel Indicator of this descriptor is 0, repeat from 3. If it is a 1, or if there are no more packets in the current channel's buffer, the other channel (CH1) becomes the current channel.
6. Repeat from 3.

It will be appreciated that by updating the register f as and when EOF bits are received by the network analyser this provides a guide as to the order in which data frames were received on different channels. The Next Channel Indicator bit serves as an indicator as to whether or not the next received data frame was received on the same channel as that on which the present data frame was received and thereby provides an indication of the order in which data frames from more than one channel are received. Accordingly, instead of software having to compare timestamps associated with data packets to construct a merged data stream, the Next Channel Indicator bit may be used. This is more efficient in terms of CPU processing capacity since conventional timestamps require 64-bits in comparison to only 1 bit used as the Next Channel Indicator bit if there are only two channels and 2 bits if there are 4 channels etc.

This technique can be enhanced to cope with more than two channels as follows.

The number of bits in the state register f is expanded to be not less than $\log_2$ (number of channels).

If an EOF occurs on a different channel from a current channel, the state register of the current channel is not changed if it is non-zero. If it is zero, the state register is set to (N−M), where N is the number of the channel on which the EOF occurred, and M is the current channel number. The subtraction is performed modulo(number of channels).

As above, the Next Channel Indicator bits for data frames received on each of the channels are used by host software to perform a merge of data from the more than two channels. In this case, the host software acts as follows to recover the data packets in chronological order:

If the software has just finished reading a packet from channel C and encounters a non-zero value D in the Next Channel Indicator bits in the next descriptor from that channel it switches to reading from channel (C+D), the addition being performed modulo(number of channels) i.e. if there are 4 channels (CH0, CH1, CH2 and CH3) and the first channel on which an EOF is received is CH1 and the valve of D is 3 the next channel on which an EOF is received is CH0.

Again, when the software reaches the end of a channel's buffer it must compare the timestamps of the next unread packets in the other channels' buffers to ascertain which channel to switch to. This is a relatively rare occurrence so it will have a negligible effect on performance. Otherwise the procedures are as for the two-channel case described above.

The Next Channel Indicator and Channel fields are provided with sufficient bits to identify the number of channels. For example, if one or two channels are provided, the Next Channel Indicator need only be assigned one bit. If however three or four channels are provided, the Next Channel Indicator is provided with two bits to enable identification of the channel from each of the four possible channels from which the frame to which a descriptor is to be added might have been received.

Preferably, as a minimum, the following information is stored in the descriptor;
1. The length of the frame as stored in host memory;
2. The length of the frame on the network link;
3. Whether various CRC or checksums errors where detected;
4. Whether the frame is an IP frame;
5. Whether the frame had a 10 b/8 b code violation;
6. Whether frame or frames prior to this one were dropped;
7. The Next Channel Indicator bits;
8. The channel that this frame arrived on;
9. The timestamp;
10. Whether the frame has been sliced (truncated).

It is preferred that the descriptor is entirely hardware generated since this improves the speed with which it can be generated as data frames are received by the network analyser card.

Figure 3:
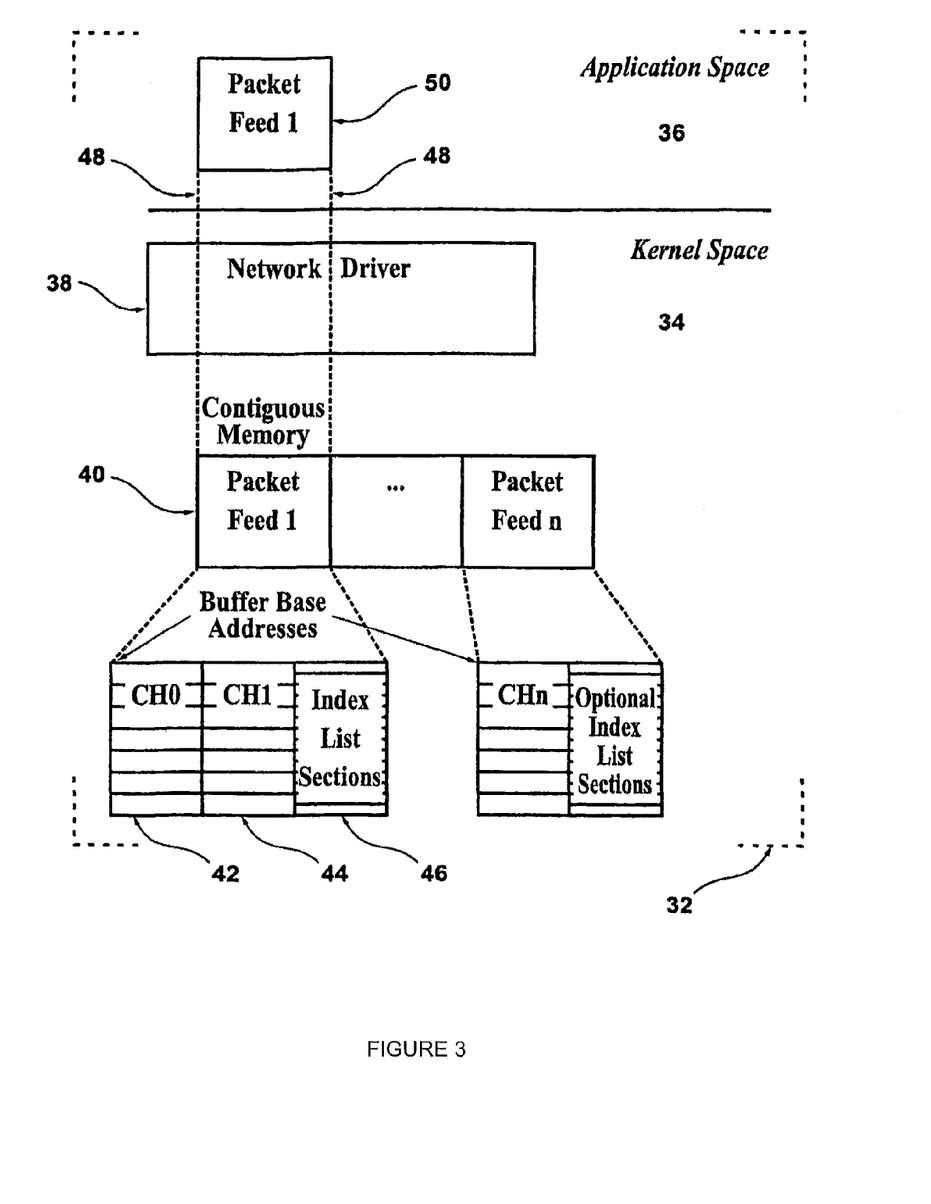

FIG. 3 shows a schematic representation of the memory layout of a host arranged to receive data packets from a network analyser card as shown in FIG. 2. The host memory has a kernel space 34 and an application space 36. The kernel space is defined by a set of memory addresses that host drivers and operating systems can use. The application space 36 is defined by a set of memory addresses that host applications can use. As will be explained below, physically the data packets are stored in a single region accessible both by kernel software and application software. Data packets are not copied from kernel space to application space. Rather, a network driver 38 is provided and is configured to map supplied virtual buffer base addresses into buffer base addresses that the application (running on the host) can use. The network driver enables an application running in application space 36 of the memory to directly access the data stored in the kernel space 34 of the memory.

Regions 40 are assigned in the kernel space 34 to store data from a particular channel or from particular channels. These regions include a number of locations 42 (shown as expanded regions for explanation only) for the storage of data from a particular channel or from particular channels. In the region in kernel space 34 labelled "Packet Feed 1", the region 40 is subdivided into regions 42 and 44 for the storage of data from channels 0 and 1, respectively, and also a region 46 in which an ordered sequence list of offsets with respect to a buffer base address is stored, the offsets corresponding to the physical location of stored frames from both channels. Each region 42 and 44 is further divided into sections.

Accordingly, instead of having to copy data from the kernel space to a corresponding region of the application space of the memory, the data is accessed directly from the application space and accordingly copying of the data is not required. This increases the efficiency of the host CPUs since they do not have to perform any copying of the data for this purpose. In addition the memory requirement can be reduced since copies of the received data do not need to be made for this purpose. The received data in this context refers to all data received in the memory from the network analyser card.

The ability to provide access to data stored in kernel space to an application running in application space of the memory is achieved with the use of offsets and virtual base addresses. As data is received into the physical memory in kernel space, a list of offsets is generated with respect to a base address within kernel space. Conventionally, this data would then all be copied to a physical region within application space of the memory. However, in an example of the present invention, instead of copying the data, the list of offsets is passed by the network driver to the application running in application space.

This list of offsets includes an offset in respect of the base address of the region and the list of offsets used with respect to the base address in kernel space. In other words, an offset to a list of offsets is provided to an application running in the application space. This enables the application running in application space to directly access the data stored in the kernel space by using an offset to locate the base address of the region within kernel space and subsequently the list of offsets with respect to that offset. This mapping is enabled by the network driver that, in this example, is arranged to provide the offsets to the application space. Memory within the region is contiguous memory to enable correct location of data stored within kernel space by the application running in application space with the use of the offsets described above.

In one example, only complete packets are stored in any one region 42, 44. In another example, a packet may sometimes be stored partly in the end of one section of a region and partly at the beginning of the next contiguous section of that region. In the latter case, the additional region usually used to store the list of offsets, is also used to reassemble packets which have straddled a boundary between regions.

The regions 40 in host memory 32 to which the packets are transferred by DMA reside physically in kernel address space 34, but are also accessible by software running in application space 36 via a different virtual base address. This is shown in FIG. 3 by dotted lines 48 passing through the network driver 38. A virtual region 50 within application space 36 corresponds to the addresses from application space necessary to access data packets in the physical region of memory in kernel space. This is important as it avoids the need to copy data from one address space to the other. Typically, such copying uses a substantial amount of host CPU capacity and accordingly it is advantageous that in an example of the present system no such copying is required.

Conventionally, data is received by a network analyser and written into the kernel space of a host memory. This data is then copied into application space of the host memory (a physically separate region within the host memory).

Within the regions 40 assigned to each channel there is an additional region 46 provided for when it is desired to merge channels. This additional region 46 is used to store offsets, relative to the buffer base address, of the packets in the channel areas and enables host application software to access the data packets in a desired order. Again, the use of offsets reduces the need for copying of data. Conventionally, host software would have been required to compile the merged data channels by comparing timestamps and copying a merged data stream to a different physical part of the memory. An embodiment of the present system enables a merged data stream to be compiled without copying of the data as required conventionally. Rather, the merged data stream is created by host software on-the-fly by referring to the list of offsets and directly accessing data packets from two or more channels to be merged.

When packets from different channels are being merged, network driver 38 builds the list 46 of offsets by reference to the Next Channel Indicator bits in the frame descriptors, as described above. The host application can then use these offsets sequentially to access the packets in merged chronological order. Optionally an offset list may be generated for packets from unmerged channels. This may provide performance advantages for the application, and also allows the application to use the same mechanism for referencing all packets, whether from merged or unmerged channels.

In use, the host memory 32 shown in FIG. 3 receives a data feed via DMA controller 26 shown in FIG. 2. The data feed is typically provided via a PCI bus link between the host memory and the network analyser card shown in FIG. 2. As data is received from a single channel, it is written to a physical region 40 assigned in the kernel space 34 to data from that particular channel. The network driver 38 maps the virtual buffer base address into a base address that application software can use. In addition, the network analyser card driver generates a list of offsets for use by the application software in combination with the buffer base address to access directly data packets stored in kernel space.

Each channel's region 40 is divided into sections, for example four, as described previously. Initially these are marked empty. These are filled e.g. by DMA hardware, in a predefined order, for example in strict rotation, wrapping from the last back to the first. When a section is filled, it is marked as full and the application software is interrupted i.e. the host CPU is interrupted.

The hardware will not put data in a section of a channel's region that is already full. It is the responsibility of the application to access the data when it is interrupted, and mark the section empty when it has finished with it. Thus, since the software is only interrupted when a section is full as opposed to when a single data packet is received in the host buffer, the host CPU is interrupted less often than it is in conventional systems. The efficiency of the host CPU is thereby improved. Each section may be configured to hold any desired number of data packets.

Conventionally, host software is arranged to monitor the host memory and becomes involved with the dropping of frames when the memory becomes full. Usually, the reason the host memory is full is related to demands made on the host CPU that affect its ability to keep up with data being received from the network. This problem is exacerbated by the requirement to drop frames as the dropping function requires further host CPU attention. Accordingly, in an embodiment of the present system, since the network analyser card hardware is configured not to put data into a section of the host memory that is already full, the card performs the dropping function and improvements are achieved in terms of host CPU utilisation.

Importantly, use of virtual base addresses enables copying of data packets stored in the host memory 32 to be avoided since an application can directly access the stored data packets in what is also kernel address space.

Embodiments of the present inventions have been described with particular reference to the examples illustrated. However, it will be appreciated that variations and modifications may be made to the examples described within in the scope of the present invention.

The invention claimed is:

1. A method of transferring multi-channel data received from a network to a host using a network analyzer card, the network analyzer card comprising: a receiver for receiving plural data frames from a network link on a first channel and a receiver for receiving plural data frames from the network link on a second channel; a descriptor adder configured and arranged to add a descriptor to at least some of the data frames received on the first channel and a descriptor adder configured and arranged to add a descriptor to at least some of the data frames received on the second channel, the descriptors including data about the data frame to which it is attached, the method comprising:
receiving data from first and second channels on the receivers of the network analyser card; and,
adding a next channel indicator bit in the descriptor associated with received data frames indicative of the next channel on which a data frame was received,
storing the data frames with the associated descriptor,
whereby when stored in an associated host memory said indicators can be used to directly merge data from said first and second channels in a desired order.

2. A network analyser card according to claim 1, wherein the descriptor adder is configured such that the descriptor includes a field for data indicative of the length of the data frame to which it is attached.

3. A network analyser card according to claim 1, wherein the descriptor adder is configured such that the descriptor includes a field for a timestamp.

4. A network analyser card according to claim 3, wherein the timestamp has a variable format.

5. A network analyser card according to claim 1, the network analyser card comprising:
a packet buffer arranged to receive and store data packets from the receiver.

6. A network analyser according to claim 5, comprising an input buffer at an input to the packet buffer and an output buffer at an output to the packet buffer.

7. A network analyser according to claim 6, arranged and configured to couple data packets from the input buffer to the output buffer via the packet buffer in dependence on a set of conditions relating to the capacity and/or level of fullness of at least one of the packet buffer, the input buffer and the output buffer.

8. A network analyser card according to claim 7, configured and arranged such that in use data is transferred from the packet buffer to the packet buffer output buffer when the following conditions are satisfied:
(a) packet buffer is determined to be not empty AND
(b) (input buffer is determined to be not full) OR (packet buffer is determined to be full) AND
(c) output buffer is determined to be not full.

9. A network analyser card according to claim 8, in which whether or not the packet buffer is determined to be full or not full is determined by an upper threshold and a lower threshold, respectively.

10. A network analyser card according to claim 9, in which the upper and lower thresholds are variable to control data input to and output from the packet buffer.

11. A network analyser card according to claim 6, comprising a bandwidth controller, arranged and configured to force a received data frame to be dropped when one or more criteria are satisfied.

12. A network analyser card according to claim 11, in which the bandwidth controller is implemented in hardware.

13. A network analyser card, the card comprising:
a first receiver for receiving plural data frames from a network link on a first channel; and,
a second receiver for receiving plural data frames from the network link on a second channel;
a first descriptor adder configured and arranged to add a descriptor for storage with the respective data frame to at least some of the received data frames from the first channel, the descriptor including data about the data frame to which it is attached for use in processing of the data frame;
a second descriptor adder configured and arranged to add a descriptor for storage with the respective data frame to at least some of the received data frames from the second channel, the descriptor including data about the data frame to which it is attached for use in processing of the data frame; wherein the first and second descriptor adders are configured and arranged to add an indicator in the descriptor associated with the data frames received by each of the two receivers to enable merging of data from the channels in an associated host, in which the indicator is a next channel indicator bit indicative of the next channel on which a data frame was received thereby enabling the merged data stream to be generated.

14. A method of creating a merged data stream in a network analyser card using data stored in regions of a host memory of the network analyser card, the regions corresponding to channels from which the data was received by the host from a network to which the network analyser card is connected, the merged data stream comprising data from at least two channels merged in a desired order, the method comprising:
reading from a first region of the host memory data of a first data packet from a first channel, the data packet having been stored with a descriptor provided by a descriptor adder of the network analyser card;
reading the descriptor associated with the first data packet, the descriptor containing a next channel indicator bit to indicate the next channel to be accessed; and,
in dependence on the indicator, reading from another region of the host memory data of a data packet from the next channel thereby enabling the merged data stream to be generated.

15. A method according to claim 14, comprising accessing a subsequent data packet from a next channel in dependence on the Next Channel Indicator bit.

16. A method according to claim 14, in which the next channel is a different channel to the first channel.

17. A method according to claim 14, in which the location of data packets in the host memory is stored in an offset list containing a list of offsets used for navigation through the host memory.

* * * * *